United States Patent
Keesara et al.

(10) Patent No.: US 9,258,214 B2
(45) Date of Patent: Feb. 9, 2016

(54) OPTIMIZED DISTRIBUTED ROUTING FOR STRETCHED DATA CENTER MODELS THROUGH UPDATING ROUTE ADVERTISEMENTS BASED ON CHANGES TO ADDRESS RESOLUTION PROTOCOL (ARP) TABLES

(71) Applicant: Avaya Inc., Basking Ridge, NJ (US)

(72) Inventors: Srikanth Keesara, Tewksbury, MA (US); Roger Lapuh, Uesslingen (CH)

(73) Assignee: AVAYA INC., Basking Ridge, NJ (US)

( * ) Notice: Subject to any disclaimer, the term of this patent is extended or adjusted under 35 U.S.C. 154(b) by 257 days.

(21) Appl. No.: 13/764,257

(22) Filed: Feb. 11, 2013

(65) Prior Publication Data

US 2014/0229631 A1  Aug. 14, 2014

(51) Int. Cl.
| | | |
|---|---|---|
| H04L 12/713 | (2013.01) | |
| H04L 29/12 | (2006.01) | |
| H04L 12/707 | (2013.01) | |
| H04L 12/721 | (2013.01) | |
| H04L 12/751 | (2013.01) | |

(52) U.S. Cl.
CPC ............ *H04L 45/22* (2013.01); *H04L 45/02* (2013.01); *H04L 45/44* (2013.01); *H04L 61/103* (2013.01)

(58) Field of Classification Search
CPC ......... H04L 45/02; H04L 45/44; H04L 45/12; H04L 61/103
USPC ................ 709/239; 370/235, 255, 351, 392
See application file for complete search history.

(56) References Cited

U.S. PATENT DOCUMENTS

| | | | |
|---|---|---|---|
| 8,194,674 B1 * | 6/2012 | Pagel et al. ............... 370/393 |
| 2004/0097232 A1 * | 5/2004 | Haverinen ........... H04L 63/162 | 455/436 |
| 2007/0008880 A1 * | 1/2007 | Buchko et al. ............... 370/218 |
| 2007/0288653 A1 * | 12/2007 | Sargor ............ H04L 29/12405 | 709/245 |
| 2008/0219273 A1 * | 9/2008 | Kaneko ....................... 370/401 |
| 2009/0154461 A1 * | 6/2009 | Kitani ................ H04L 12/4633 | 370/392 |
| 2011/0317700 A1 * | 12/2011 | Assarpour ..................... 370/392 |
| 2012/0041767 A1 * | 2/2012 | Hoffman et al. ............... 705/1.1 |
| 2014/0119173 A1 * | 5/2014 | Regan et al. ................... 370/219 |

FOREIGN PATENT DOCUMENTS

| | | |
|---|---|---|
| EP | 0599764 | 6/1994 |
| EP | 2533475 | 12/2012 |

OTHER PUBLICATIONS

GB Search Report dated Jun. 13, 2014, 4 pages.

* cited by examiner

*Primary Examiner* — Larry Donaghue
*Assistant Examiner* — Jasmine Nguyen
(74) *Attorney, Agent, or Firm* — Anderson Gorecki & Rouille LLP

(57) ABSTRACT

A method, apparatus and computer program product for performing optimized distributed routing for stretched data center models through updating route advertisements based on changes to Address Resolution Protocol (ARP) Tables is presented. Port members of an Internet Protocol I (IP) interface or Virtual Local Area Network (VLAN) are distinguished into Access Interfaces which only lead to hosts on said subnet and Trunk Interfaces which lead to other redundant routers on said subnet. In the subnet of a network a network route for the subnet is always advertised. A separate host route corresponding to an Internet Protocol (IP) address of each Address Resolution Protocol (ARP) table record that points to an Access Interface is advertised and route advertisements are changed for a host in said subnet for tracked access interfaces.

21 Claims, 3 Drawing Sheets

OPTIMIZED DISTRIBUTED ROUTING FOR STRETCHED DATA CENTER MODELS THROUGH UPDATING ROUTE ADVERTISEMENTS BASED ON CHANGES TO ADDRESS RESOLUTION PROTOCOL (ARP) TABLES

BACKGROUND

It is typical to configure an IP subnet on multiple routers as a directly attached subnet. This is done for redundancy reasons so that the loss or failure of any single router does not result in loss of service to hosts in the subnet. In such a configuration with two routers A and B on the subnet it is typical that some of the hosts on the subnet are closer to Router A and other hosts on the same subnet are closer to Router B. Techniques like Virtual Router Redundancy Protocol (VRRP) (with backup master capability) and Routed Split Multi Link Trunking (RSMLT) have been used to ensure that routed traffic from a host within the subnet to elsewhere in the network uses the router that is closest to the host thus ensuring optimal forwarding in terms of network bandwidth usage, hop counts and latency.

SUMMARY

Conventional mechanisms such as those explained above suffer from a variety of deficiencies. One such deficiency is when the reverse direction traffic to the hosts on a subnet may be subjected to some sub optimal paths caused specifically by having multiple routers advertise the same subnet to the rest of the network. For example, if Router A and Router B both advertise the subnet another router in the network (Router C) picks either Router A or Router B as the next hop for traffic destined to all the hosts in the subnet. This selection does not take into account the relative proximity of any given host within the subnet to Router A and Router B. As a result traffic from other routers in the network to some hosts within the subnet could become sub optimal.

Solving this problem has become more important in the context of Layer 2 (L2) virtualization where the hosts within a subnet are not all in the same cluster and/or wiring closet (as is the case the with a traditional campus network). They could be spread apart all over a Data Center or a large campus network. Technologies like vMotion allow a Virtual Machine (VM) host to move from one site to another site in the network while retaining the Internet Protocol (IP) address of the host. This could mean that in such networks a good percentage of the hosts are having their traffic delivered in a sub optimal fashion.

Embodiments of the invention significantly overcome such deficiencies and provide mechanisms and techniques that provide optimized distributed routing through update route advertisements based on changes to Address Resolution Protocol (ARP) tables.

In a particular embodiment of a method for providing optimized distributed routing, the method includes, in a subnet of a network, distinguishing port members of an Internet Protocol I (IP) interface or Virtual Local Area Network (VLAN) into Access Interfaces which only lead to hosts on said subnet and Trunk Interfaces which lead to other redundant routers on said subnet. The method further includes in said subnet of a network, always advertising a network route for the subnet. Additionally the method includes advertising a separate host route corresponding to an Internet Protocol (IP) address of each Address Resolution Protocol (ARP) table record that points to an Access Interface; and changing route advertisements for a host in said subnet for tracked access interfaces.

Other embodiments include a computer readable medium having computer readable code thereon for providing optimized distributed routing. The computer readable medium includes instructions for, in a subnet of a network, distinguishing port members of an Internet Protocol I (IP) interface or Virtual Local Area Network (VLAN) into Access Interfaces which only lead to hosts on said subnet and Trunk Interfaces which lead to other redundant routers on said subnet. The computer readable medium further includes instructions for, in said subnet of a network, always advertising a network route for the subnet. Additionally the computer readable medium includes instructions for advertising a separate host route corresponding to an Internet Protocol (IP) address of each Address Resolution Protocol (ARP) table record that points to an Access Interface; and instructions for changing route advertisements for a host in said subnet for tracked access interfaces.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides provide optimized distributed routing through update route advertisements based on changes to ARP tables as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer readable medium including computer program logic encoded thereon that when performed in a computerized device provides associated operations providing provide optimized distributed routing through update route advertisements based on changes to ARP tables as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
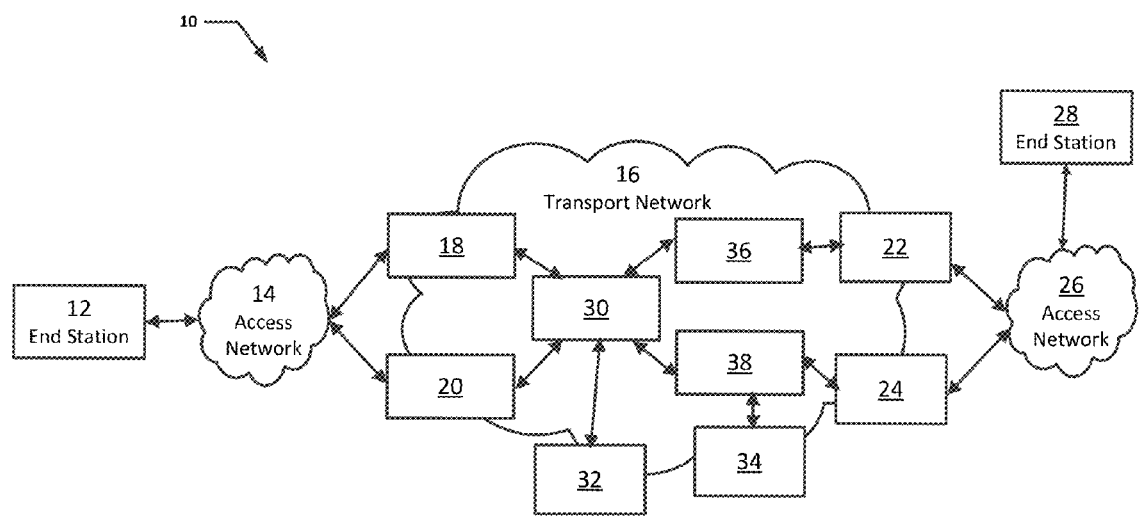
FIG. 1 a block diagram of a network in accordance with embodiments of the invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

This invention proposes tracking certain ARP table updates and changing the routing information advertised by a router in response to the advertisements. ARP stands for Address Resolution Protocol, and is used to associate a layer 3 (Network layer) address (such as an IP address) with a layer 2 (Data Link layer) address (MAC address). The IP address is a layer 3 (network layer) address. The MAC address is a layer 2 (data link) address. The layer 3 address is a logical address. It will pertain to a single protocol (such as IP, IPX, or the like). The layer 2 address is a physical address. It pertains to the actual hardware interface (NIC) in the computer. A computer can have any number of layer 3 addresses but it will only have a single layer 2 address per LAN interface. At layer 3, the data is addressed to the host that the data is destined for. At layer 2 though, the data is addressed to the next hop. This is useful because you only need to know a host's layer 3 address (which can be found out by using DNS for instance) but you won't need to know the hardware address (and you won't have to bog down the network by sending an ARP request across the network to find it out). The layer 3 packet (addressed to the destination host) will be encapsulated within a layer 2 frame (addressed to the next hop).

FIG. 1 illustrates an environment 10 wherein a first access network 14 and a second access network 28 are interconnected by way of a transport network 16. Transport network 16 consists of switches/routers that support Layer-2 and Layer-3 forwarding. The transport network 16 includes a group of network devices, 18, 20, 22, 24, 30, 32, 34, 36 and 38.

Network devices 18, 20, 22, 24, 32 and 34 are herein referred to as edge devices or edge routers while network devices 30, 36 and 38 are herein referred to as core devices or core routers. A packet transmitted from an edge station 12 through access network 14 destined for edge station 28 through access network 26 would enter transport network 16 via edge device 20, be forwarded to core device 30, be forwarded to core device 38, forwarded to edge device 24 then to access network 26.

The presently described method and apparatus for performing optimized distributed routing through update route advertisements based on changes to ARP tables applies to edge routers 18, 20, 22 and 24. The port members of the IP Interface (or VLAN) are divided into two groups access interfaces and trunk interfaces. Access Interfaces are the set of interfaces only lead to hosts (not routers) on the subnet. Access Interfaces can be separated into two sub groups, namely, normal Access Interfaces which do not implement the presently described method for performing optimized distributed routing through update route advertisements based on changes to ARP tables and tracked Access Interfaces which implement the presently described method for performing optimized distributed routing through update route advertisements based on changes to ARP tables. Trunk Interfaces are the set of interfaces that lead to other redundant routers on the subnet.

In FIG. 1, access interfaces would be the interfaces on edge router 18, 20, 22 and 24 that connect to access network 14 or access network 26. Trunk interfaces would be the interfaces on edge router 18, 20, 22 and 24 that connect to core routers 30, 36, 38 or 34. The following rules are applied to route advertisements from a directly attached router in the subnet. Always advertise the network route for the subnet (less than 32 bit mask). Advertise a separate host route (32 bit mask) corresponding to the IP address of each ARP table record that points to an Access Interface.

Changes to the route advertisements for host in the subnet are managed as follows for tracked access interfaces. If an ARP record ages out withdraw the route advertisement for the host route associated that ARP Record. If an ARP record which was previously pointing to an Access Interface now points to a Trunk Interface (possibly because of a station movement), withdraw the route advertisement for the host route associated that ARP Record. If an ARP record which was previously pointing to a Trunk Interface now points to an Access Interface (possibly because of a station movement), advertise the corresponding IP address as a host route (32 bit mask). If a new ARP record is learnt which points to an Access Interface advertise the corresponding IP address as a host route (32 bit mask). If a new APR record is learnt which points to a Trunk Interface do not change any route advertisements.

Since routers use longest prefix first rule when finding the best route another router in the network first finds the host route when trying to forward traffic to hosts within the subnet. Since the host route advertisement is based on whichever router is the closest to the host this eliminates the potential sub optimal routing behavior caused by having multiple routers serving as gateways for a subnet.

If a host ARP has not been learnt yet the packet will be forwarded to one of the routers using the network route which could be sub optimal. But the protocol actions required to forward the packet to the host will force ARP for the host to be learnt and its host route to be advertised so that further traffic could be forwarded in an optimal fashion.

By deploying route summarization at boundary routers, a network operator can ensure that frequent routing updates are not being spread too widely in the network.

When this invention is applied to a SPB Network, the identification of access and trunk ports is very easy. UNIs are access interfaces and NNIs are trunk interfaces.

This kind of generation of host routes may not be appropriate in all situations (hence the use of normal access interfaces and tracked access interfaces). For example advertising all hosts in the network as routes could cause stress on the route tables and central processing units (CPUs) of small routers. It is expected that this invention is used selectively for situations that demand very low latency and/or are extremely sensitive to network bandwidth usage. The scope of the application of the present invention may be limited by operator or vendor choice to a few selected subnets and hosts if necessary. A flag on a per interface basis can turn this functionality on or off.

Figure 2:
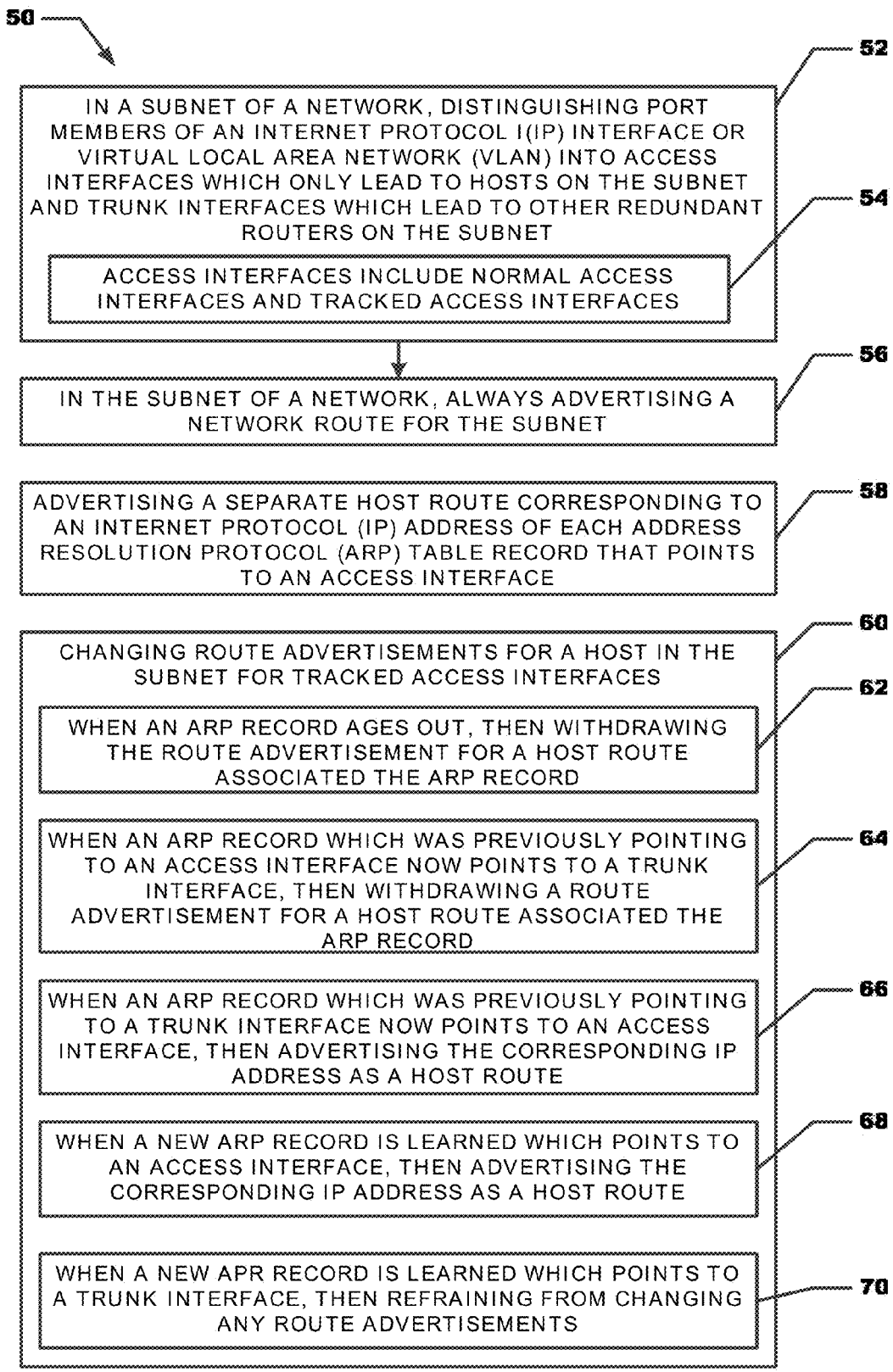
FIG. 2 comprises a flow diagram of a method for performing optimized distributed routing through update route advertisements based on changes to ARP tables in accordance with embodiments of the invention.

A flow chart of the presently disclosed method is depicted in FIG. 2. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, in a particular embodiment of a method 50 for performing optimized distributed routing through update route advertisements based on changes to ARP tables, method 50 begins with processing block 52 which discloses that in a subnet of a network, distinguishing port members of an Internet Protocol I (IP) interface or Virtual Local Area Network (VLAN) into Access Interfaces which only lead to hosts on the subnet and Trunk Interfaces which lead to other redundant routers on the subnet. As shown in processing block 54 the Access Interfaces include normal Access Interfaces and tracked Access Interfaces. Normal Access Interfaces do not implement the presently described method for performing optimized distributed routing through update route advertisements based on changes to ARP tables while tracked Access Interfaces implement the presently described method for performing optimized distributed routing through update route advertisements based on changes to ARP tables.

Processing block 56 states in the subnet of a network, always advertising a network route for the subnet. Processing block 58 recites advertising a separate host route corresponding to an Internet Protocol (IP) address of each Address Resolution Protocol (ARP) table record that points to an Access Interface.

Processing block 60 discloses changing route advertisements for a host in the subnet for tracked access interfaces. As shown in processing block 62, when an ARP record ages out, then withdrawing the route advertisement for a host route associated the ARP Record. As shown in processing block 64 when an ARP record which was previously pointing to an Access Interface now points to a Trunk Interface, then withdrawing a route advertisement for a host route associated the ARP Record. Processing block 66 shows when an ARP record which was previously pointing to a Trunk Interface now points to an Access Interface, then advertising the corresponding IP address as a host route. Processing block 68 states when a new ARP record is learned which points to an Access Interface, then advertising the corresponding IP address as a host route, and processing block 70 recites when a new APR record is learned which points to a Trunk Interface, then refraining from changing any route advertisements.

Figure 3:
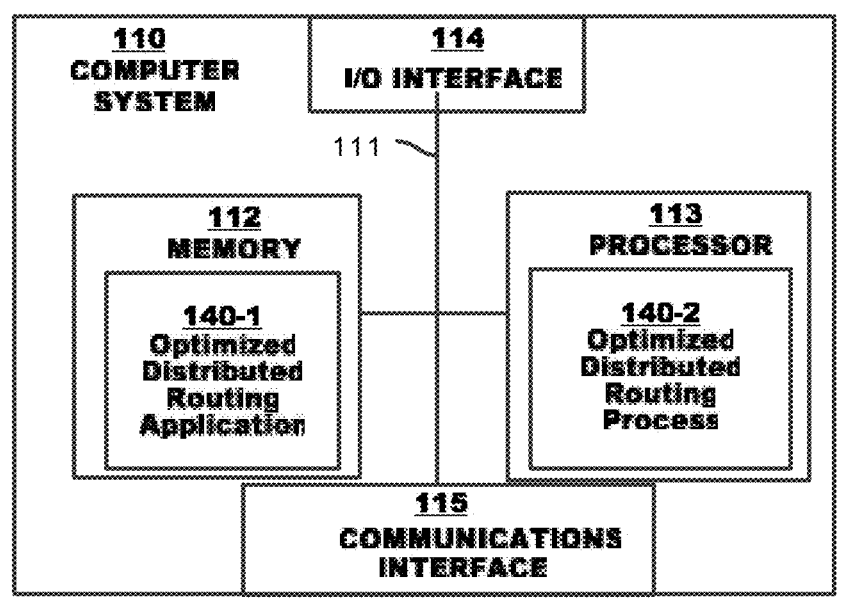
FIG. 3 illustrates an example computer system architecture for a computer system that performs optimized distributed routing through update route advertisements based on changes to ARP tables in accordance with embodiments of the invention.

FIG. 3 is a block diagram illustrating example architecture of a computer system 110 that executes, runs, interprets, operates or otherwise performs a optimized distributed routing operating application 140 1 and optimized distributed routing operating process 140 2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the optimized distributed routing operating application 140 1 and process 140 2 provides on the display 130. Essentially, the graphical user interface 160 is where the customer 108 1 performs their 'online banking', specifying which bills are to be paid electronically, when those bills are to be paid, and the amount to be paid. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with an optimized distributed routing operating application 140 1 as explained herein. The optimized distributed routing operating application 140 1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of an optimized distributed routing operating application 140 1. Execution of a optimized distributed routing operating application 140 1 in this manner produces processing functionality in the optimized distributed routing operating process 140 2. In other words, the optimized distributed routing operating process 140 2 represents one or more portions or runtime instances of an optimized distributed routing operating application 140 1 (or the entire an optimized distributed routing operating application 140 1) performing or executing within or upon the processor 113 in the computerized device 110 at runtime.

It is noted that example configurations disclosed herein include the optimized distributed routing operating application 140 1 itself (i.e., in the form of un executed or non performing logic instructions and/or data). The optimized distributed routing operating application 140 1 may be stored on a computer readable medium (such as a floppy disk), hard disk, electronic, magnetic, optical, or other computer readable medium. A optimized distributed routing operating application 140 1 may also be stored in a memory system 112 such as in firmware, read only memory (ROM), or, as in this example, as executable code in, for example, Random Access Memory (RAM). In addition to these embodiments, it should also be noted that other embodiments herein include the execution of a optimized distributed routing operating application 140 1 in the processor 113 as the optimized distributed routing operating process 140 2. Those skilled in the art will understand that the computer system 110 may include other processes and/or software and hardware components, such as an operating system not shown in this example.

A display 130 need not be coupled directly to computer system 110. For example, the optimized distributed routing operating application 140 1 can be executed on a remotely accessible computerized device via the network interface 115. In this instance, the graphical customer interface 160 may be displayed locally to a customer 108 of the remote computer, and execution of the processing herein may be client server based.

During operation, processor 113 of computer system 100 accesses memory system 112 via the interconnect 111 in order to launch, run, execute, interpret or otherwise perform the logic instructions of the optimized distributed routing application 140 1. Execution of optimized distributed routing application 140 1 produces processing functionality in optimized distributed routing process 140 2. In other words, the optimized distributed routing process 140 2 represents one or more portions of the optimized distributed routing application 140 1 (or the entire application) performing within or upon the processor 113 in the computer system 100.

It should be noted that, in addition to the optimized distributed routing process 140 2, embodiments herein include the optimized distributed routing application 140 1 itself (i.e., the un executed or non performing logic instructions and/or data). The optimized distributed routing application 140 1 can be stored on a computer readable medium such as a floppy disk, hard disk, or optical medium. The optimized distributed routing application 140 1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of optimized distributed routing application 140 1 in processor 113 as the optimized distributed routing process 140 2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor controlled devices that may be similar or different devices. Use of such "microprocessor" or "processor" terminology may thus also be understood to include a central processing unit, an arithmetic logic unit, an application specific integrated circuit (IC), and/or a task engine, with such examples provided for illustration and not limitation.

Furthermore, references to memory, unless otherwise specified, may include one or more processor readable and accessible memory elements and/or components that may be internal to the processor controlled device, external to the processor controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD ROM, a DVD ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer implemented method in which a computer system performs operations comprising:
    in a subnet of a network, distinguishing port members of an Internet Protocol (IP) interface or Virtual Local Area Network (VLAN) into Access Interfaces which only lead to hosts on said subnet and Trunk Interfaces which lead to other redundant routers on said subnet, and wherein said Access Interfaces include normal Access Interfaces and tracked Access interfaces;
    in said subnet of a network, always advertising a network route for the subnet;
    advertising a separate host route corresponding to an Internet Protocol (IP) address of each Address Resolution Protocol (ARP) table record that points to an Access Interface; and
    tracking ARP table record updates and, based on changes to said ARP table records, changing route advertisements for a host in said subnet for tracked access interfaces.

2. The method of claim 1 wherein when an ARP record ages out, then withdrawing the route advertisement for a host route associated said ARP Record.

3. The method of claim 1 wherein when an ARP record which was previously pointing to an Access Interface now points to a Trunk Interface, then withdrawing a route advertisement for a host route associated said ARP Record.

4. The method of claim 1 wherein when an ARP record which was previously pointing to a Trunk Interface now points to an Access Interface, then advertising the corresponding IP address as a host route.

5. The method of claim 1 wherein when a new ARP record is learned which points to an Access Interface, then advertising the corresponding IP address as a host route.

6. The method of claim 1 wherein when a new APR record is learned which points to a Trunk Interface, then refraining from changing any route advertisements.

7. The method of claim 1 wherein said tracked access interfaces are manually selected.

8. A non-transitory computer readable storage medium having computer readable code thereon for optimized distributed routing, the medium including instructions in which a computer system performs operations comprising:
    in a subnet of a network, distinguishing port members of an Internet Protocol (IP) interface or Virtual Local Area Network (VLAN) into Access Interfaces which only lead to hosts on said subnet and Trunk Interfaces which lead to other redundant routers on said subnet, and wherein said Access Interfaces include normal Access Interfaces and tracked Access interfaces;
    in said subnet of a network, always advertising a network route for the subnet;
    advertising a separate host route corresponding to an Internet Protocol (IP) address of each Address Resolution Protocol (ARP) table record that points to an Access Interface; and
    tracking ARP table record updates and, based on changes to said ARP table records, changing route advertisements for a host in said subnet for tracked access interfaces.

9. The non-transitory computer readable storage medium of claim 8 wherein when an ARP record ages out, then withdrawing the route advertisement for a host route associated said ARP Record.

10. The non-transitory computer readable storage medium of claim 8 wherein when an ARP record which was previously pointing to an Access Interface now points to a Trunk Interface, then withdrawing a route advertisement for a host route associated said ARP Record.

11. The non-transitory computer readable storage medium of claim 8 wherein when an ARP record which was previously pointing to a Trunk Interface now points to an Access Interface, then advertising the corresponding IP address as a host route.

12. The non-transitory computer readable storage medium of claim 8 wherein when a new ARP record is learned which points to an Access Interface, then advertising the corresponding IP address as a host route.

13. The non-transitory computer readable storage medium of claim 8 wherein when a new APR record is learned which points to a Trunk Interface, then refraining from changing any route advertisements.

14. The non-transitory computer readable storage medium of claim 8 wherein said tracked access interfaces are manually selected.

15. A computer system comprising:
    a memory;
    a processor;
    a communications interface;
    an interconnection mechanism coupling the memory, the processor and the communications interface; and
    wherein the memory is encoded with an application providing optimized distributed routing, that when performed on the processor, provides a process for processing information, the process causing the computer system to perform the operations of:

in a subnet of a network, distinguishing port members of an Internet Protocol (IP) interface or Virtual Local Area Network (VLAN) into Access Interfaces which only lead to hosts on said subnet and Trunk Interfaces which lead to other redundant routers on said subnet, and wherein said Access Interfaces include normal Access Interfaces and tracked Access interfaces;

in said subnet of a network, always advertising a network route for the subnet;

advertising a separate host route corresponding to an Internet Protocol (IP) address of each Address Resolution Protocol (ARP) table record that points to an Access Interface; and tracking ARP table record updates and, based on changes to said ARP table records, changing route advertisements for a host in said subnet for tracked access interfaces.

16. The computer system of claim 15 wherein when an ARP record ages out, then withdrawing the route advertisement for a host route associated said ARP Record.

17. The computer system of claim 15 wherein when an ARP record which was previously pointing to an Access Interface now points to a Trunk Interface, then withdrawing a route advertisement for a host route associated said ARP Record.

18. The computer system of claim 15 wherein when an ARP record which was previously pointing to a Trunk Interface now points to an Access Interface, then advertising the corresponding IP address as a host route.

19. The computer system of claim 15 wherein when a new ARP record is learned which points to an Access Interface, then advertising the corresponding IP address as a host route.

20. The computer system of claim 15 wherein when a new APR record is learned which points to a Trunk Interface, then refraining from changing any route advertisements.

21. The computer system of claim 15 wherein said tracked access interfaces are manually selected.

* * * * *